United States Patent [19]
Mandelcorn et al.

[11] Patent Number: 5,898,561
[45] Date of Patent: Apr. 27, 1999

[54] CAPACITOR ARRANGEMENT AND METHOD OF STABILIZING SAME

[75] Inventors: Lyon Mandelcorn; Stephen R. Gurkovich, both of Pittsburgh; Kenneth C. Radford, North Huntingdon; Robert L. Miller, Murrysville; James F. Roach, Oakmont, all of Pa.

[73] Assignee: Northrop Grumman Corporation, Los Angeles, Calif.

[21] Appl. No.: 08/962,513

[22] Filed: Oct. 31, 1997

[51] Int. Cl.$^6$ .............................. H01G 4/30; H01G 4/06
[52] U.S. Cl. ...................... 361/301.4; 361/311; 361/312; 361/321.5; 29/25.42
[58] Field of Search ............................. 361/301.4, 301.3, 361/301.5, 305, 306.1, 306.2, 311–313, 308.1, 320, 321.1–321.5, 322, 328, 329, 502, 509, 511–512, 517, 518–519, 521, 522, 524, 528–530, 532, 536–537, 541, 735; 257/303, 310, 306; 29/25.42; 438/240, 244, 253

[56] References Cited

U.S. PATENT DOCUMENTS

| | | | |
|---|---|---|---|
| 974,029 | 10/1910 | Creighton | 361/509 |
| 4,663,824 | 5/1987 | Kenmochi | 361/509 |
| 5,369,547 | 11/1994 | Evans | 361/516 |
| 5,380,341 | 1/1995 | Matthew et al. | 29/25.03 |
| 5,444,599 | 8/1995 | Durpaz et al. | 361/274.1 |
| 5,726,908 | 3/1998 | Hosmer et al. | 364/509 |

*Primary Examiner*—Kristine Kincaid
*Assistant Examiner*—Anthony Dinkins
*Attorney, Agent, or Firm*—Walter G. Sutcliff

[57] ABSTRACT

A capacitor module having a solid dielectric is cleared in a gaseous environment having an electric strength greater than that of air at a pressure of one atmosphere. A plurality of such cleared capacitor modules is formed into a stack which itself is then cleared by the same clearing process. During intended operation in an electric circuit, the capacitor arrangement would be maintained in such gaseous environment having an electric strength greater than that of air at a pressure of one atmosphere.

13 Claims, 5 Drawing Sheets

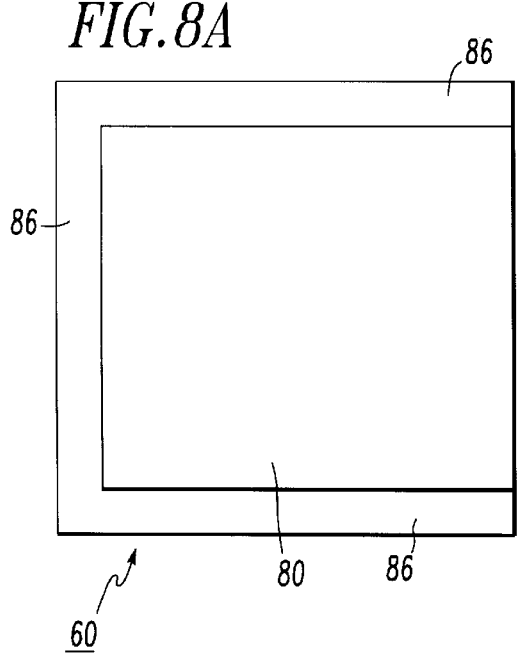
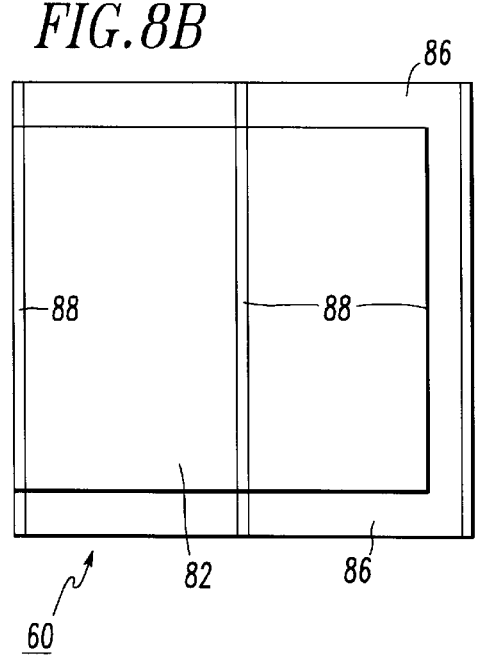
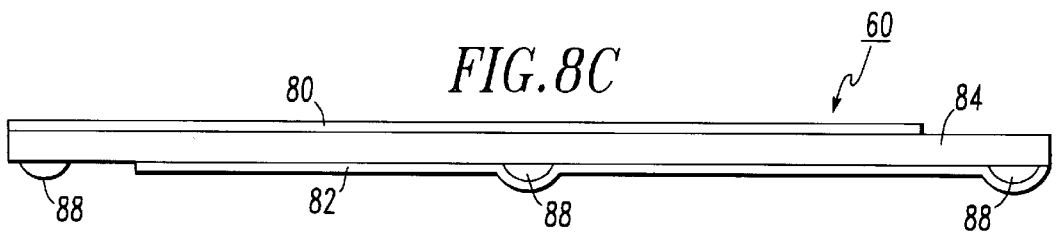
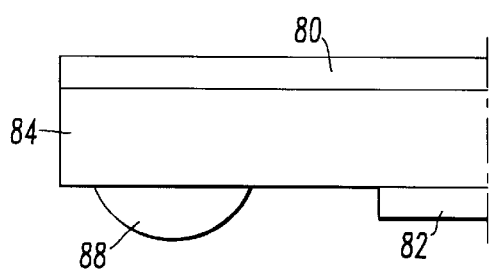
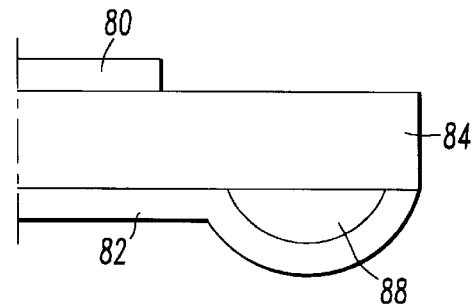

CAPACITOR ARRANGEMENT AND METHOD OF STABILIZING SAME

STATEMENT OF GOVERNMENT INTEREST

The Government has rights in this invention in accordance with a contract with the Department of Defense.

BACKGROUND OF THE INVENTION

1. Field of the Invention

The invention in general relates to capacitors, and more particularly to a solid dielectric capacitor and method of stabilizing it prior to its use in an electric circuit.

2. Description of Related Art

A capacitor is an electrical element which includes two electrodes separated by a dielectric which may be a gas, a liquid or a solid material. Many advanced electrical and electronic systems require low loss capacitors with higher performance in terms of capacitance, energy and power densities and operating temperature. One class of capacitors in use in such systems utilizes a solid dielectric in the form of a polymer.

Improved polymer dielectrics result in a capacitor which can operate at a temperature of less than 300° C. For example, a mica-silicone capacitor is commercially available with a maximum operating temperature of around 260° C., an operating voltage stress value of approximately 25 volts per micron thickness of dielectric material (V/$\mu$m), and having an energy density of 0.014 J/cm$^3$. Most polymer film capacitors, however, generally operate below 100° C. at 100V/$\mu$m, with an energy density of approximately 0.15 J/cm$^3$. Energy discharge polymer film capacitors can operate with short lives at 400 V/$\mu$m with an energy density of around 2 J/cm$^3$.

Ceramics can also be used as high temperature capacitor dielectrics in view of their thermal capability of remaining stable at temperatures greater than 400° C. In addition, the dielectric constant of various ceramics can extend into the thousands, affording them high energy density, whereas that of polymers do not exceed about 20.

Present ceramic capacitor dielectrics however exhibit relatively low voltage stress capability compared to polymer dielectrics, for example, 10 V/$\mu$m for ceramic vs. 100 V/$\mu$m (and as high as 400 V/$\mu$m) for polymers. In addition, the energy density of a typical ceramic does not exceed about 0.1 J/cm$^3$ (at 2 V/$\mu$m), and is usually much lower, whereas polymer dielectrics can be operated as high as 2 J/cm$^3$ (at 400 V/$\mu$m).

The present invention gives ceramics the capability of operating at high temperatures with high voltage stress capability and high energy density, and gives polymers the capability of operating at higher temperatures than the present limit due to the presence of a liquid impregnant which must be used.

SUMMARY OF THE INVENTION

A capacitor arrangement is provided having at least one capacitor module which includes a solid dielectric with very thin electrodes on opposite surfaces thereof and which is stabilized prior to its use in an electric circuit. The stabilization is accomplished by placing the capacitor module in an ambient gaseous environment having an electric strength greater than that of air at a pressure of one atmosphere. The capacitor module is cleared by applying an increasing voltage to the thin capacitor electrodes up to a value which is greater than the maximum operating voltage of the capacitor module. Thereafter, the cleared capacitor module is maintained in an in an ambient gaseous environment having an electric strength greater than that of air at a pressure of one atmosphere, for use during intended operation thereof in said electrical circuit. The capacitor arrangement may also be constituted by a plurality of such capacitor modules arranged in a stack.

BRIEF DESCRIPTION OF THE DRAWINGS

FIGS. 8A to 8E illustrates respective top, bottom, side and enlarged edge views of a capacitor module according to the present invention.

DESCRIPTION OF THE PREFERRED EMBODIMENT

Figure 1:
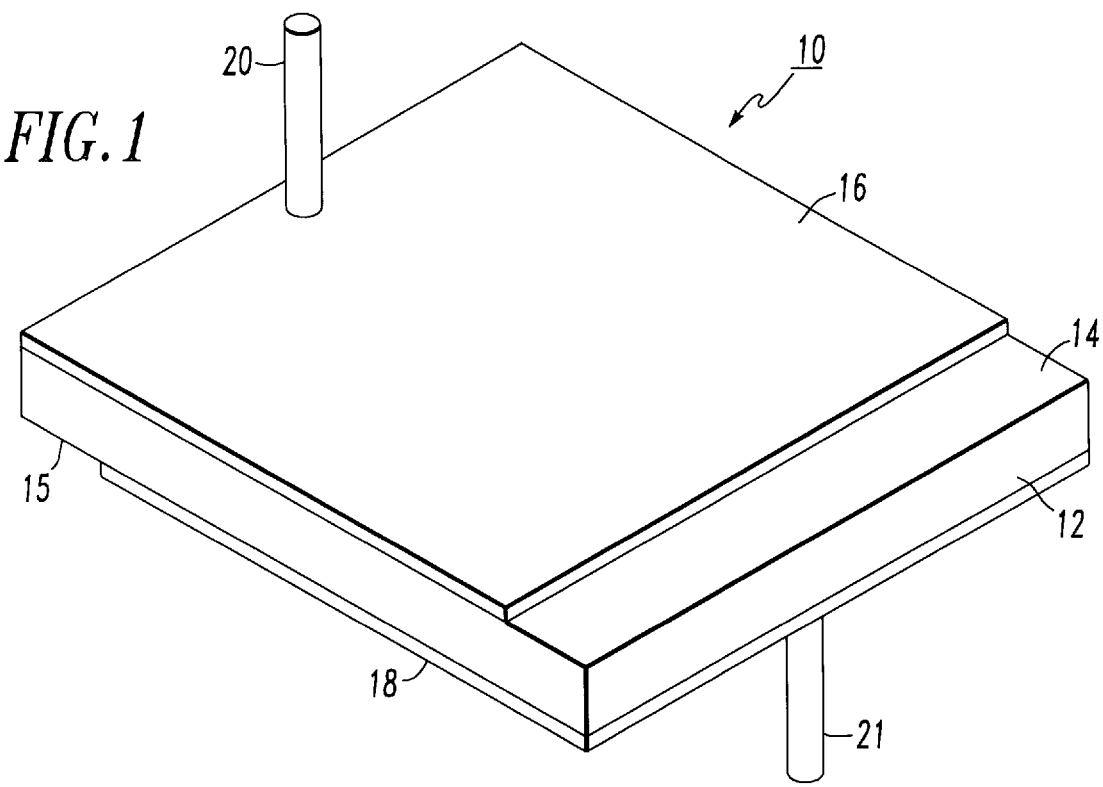
FIG. 1 is an isometric view of a typical solid dielectric capacitor.

In the drawings, which are not necessarily to scale, like or corresponding parts are denoted by like or corresponding reference numerals.

FIG. 1 illustrates a capacitor 10 formed of a solid dielectric 12 having opposed surfaces 14 and 15. Deposited on dielectric surfaces 14 and 15 are respective electrodes 16 and 18 to which electrical contact is made by respective electrical leads 20 and 21. At least one of these electrodes is of a very thin metal, such as aluminum or zinc, which is deposited in a thin layer by evaporation, sputtering, or the like. For flexible dielectrics, the capacitor may also take the form of a flattened or cylindrical jellyroll configuration.

As a result of the manufacturing process of the dielectric 12, certain defects inevitably occur and show up, by way of example, as holes, cracks, thin spots, foreign particles and structural discontinuities. During operation of the capacitor in an electric circuit breakdowns can occur at these low voltage strength defects. Accordingly, to eliminate these unwanted breakdowns, the capacitor is initially stabilized by a clearing process.

Figure 2:
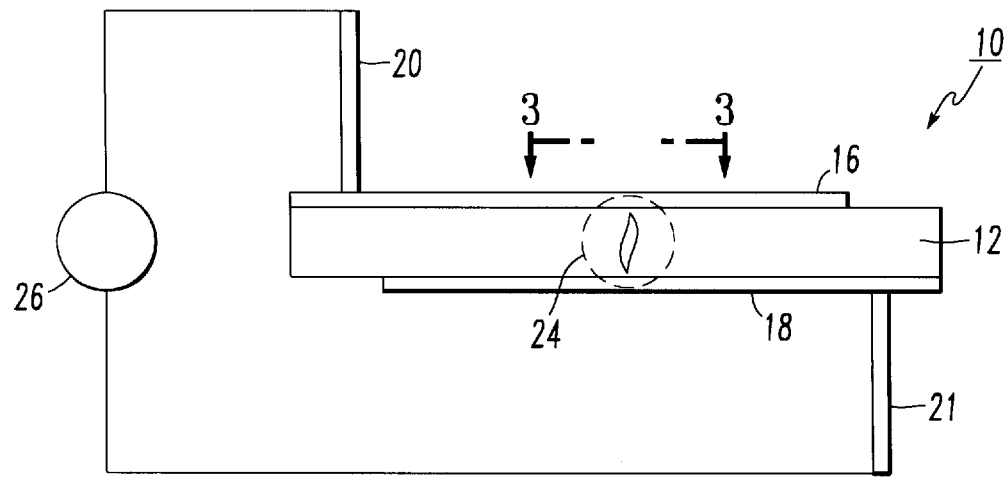
FIG. 2 is a side view of the capacitor of FIG. 1, illustrating a defect.

FIG. 2 illustrates a clearing process for eliminating the effects of a typical defect 24 within the dielectric 12. Basically, in the clearing process a portion of the electrode above and below the defect is removed such that the section of dielectric containing the defect is effectively eliminated from the active circuit. This is accomplished, as illustrated in FIG. 2, by application of an increasing voltage, provided by voltage source 26, to the electrodes 16 and 18 via leads 20 and 21, and applied to a level greater than the expected operating voltage of the capacitor.

Figure 3A:
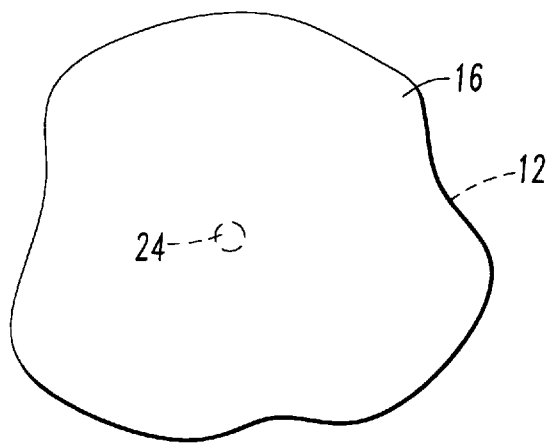
FIGS. 3A to 3D are views along line 3—3 of FIG. 2, showing the results of a clearing process.
Figure 3B:
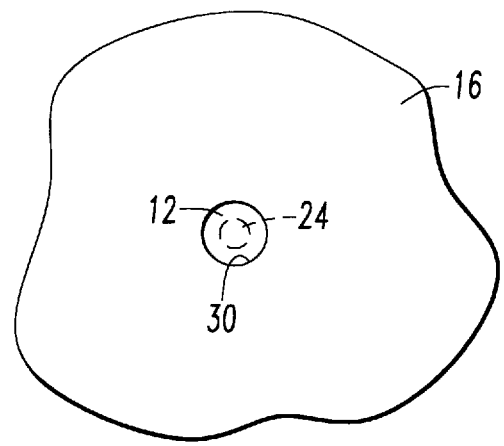
Figure 3C:
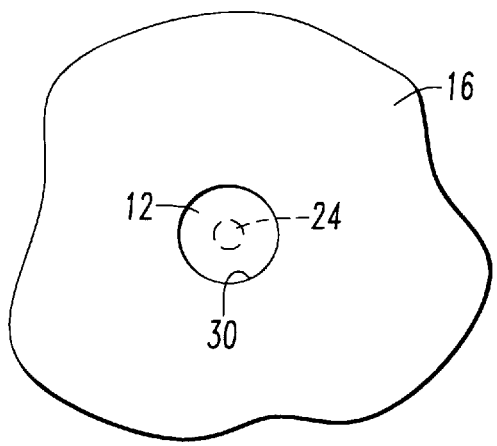
Figure 3D:
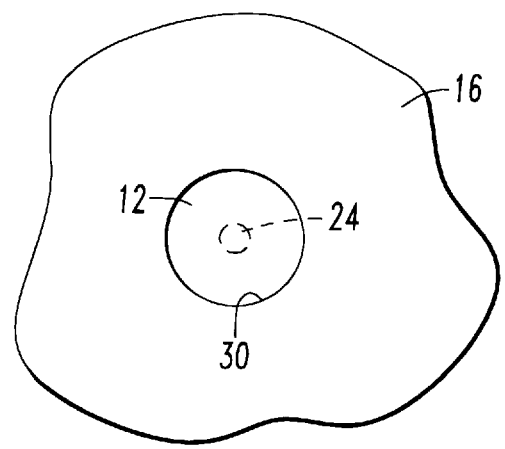

FIG. 3A shows a portion of top electrode 16 covering defect 24 within the dielectric 12. As the applied voltage increases, and as illustrated in FIG. 3B, a portion of the electrode 16 starts receding from a point directly above the defect 24 due to the discharge, which forms a hole 30 in the thin electrode 16, baring the dielectric 12. This action will also occur at electrode 18, if it too is a thin electrode deposited by sputtering or evaporation. The continued application of the increasing applied voltage causes the thin electrode 16 to melt, evaporate and oxidize thereby increasing the diameter of the hole 30, and exposing more bare dielectric around the defect 24, as illustrated in FIG. 3C. The process is continued until sufficient electrode has been removed, as illustrated in FIG. 3D, such that the diameter of the bared dielectric interposes sufficient insulation to extinguish the discharge, thereby isolating the defect region. Although the clearing operation removes electrode material and reduces the overall capacitance, this decrease in capacitance, if not greater than a predetermined percentage, for example 3%, is acceptable for most applications.

Figure 4:
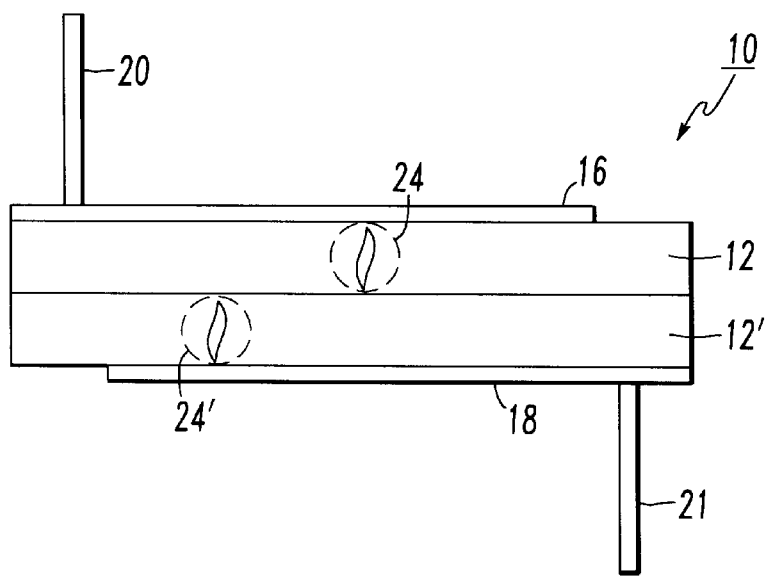
FIG. 4 illustrates a multilayer dielectric.

Another way to reduce the effect of defects, used with polymer dielectrics, is to utilize multiple layers of dielectric as illustrated in FIG. 4. The capacitor 10' includes two layers 12 and 12' of dielectric. Layer 12 has a defect 24 and layer 12' has a defect 24' which is not in alignment with defect 24. Thus the applied voltage is not afforded a continuous low electric strength path. With additional dielectric layers the probability is very low that defects in adjacent layers will be superimposed.

When utilizing a ceramic dielectric however, the defect content is relatively high compared to a polymer dielectric and consequently there is a high probability that defect regions will line up when multiple ceramic layers are used. In addition, due to the brittleness of ceramics, the conventional clearing operation previously described, in many cases causes the ceramic dielectric to crack and become unusable.

Figure 5:
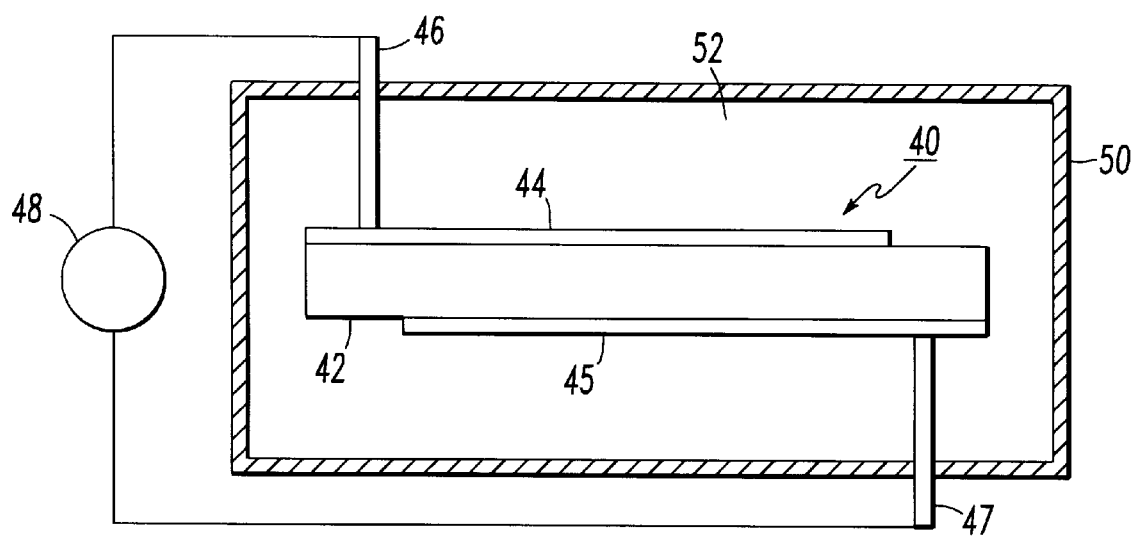
FIG. 5 illustrates a clearing process according to the present invention.

FIG. 5 illustrates an arrangement and process whereby the voltage stress of ceramic dielectrics can be effectively increased resulting in ceramic capacitors which can be operated at higher energy densities than previously possible and at temperatures of 400° C., or higher, with energy densities comparable with polymer dielectrics at low temperatures.

In FIG. 5 capacitor 40 includes a ceramic dielectric 42, one example of which may be borosilicate, having thin electrodes 44 and 45 on opposite surfaces thereof. Electrical leads 46 and 47 are respectively connected to the electrodes 44 and 45, as well as to a voltage source 48.

The capacitor 40 is enclosed within a sealed container 50 the interior of which is filled with a gaseous ambient environment 52 having an electric strength greater than that of air at a pressure of one atmosphere. The electric strength of a gas is a measure of its breakdown capability under an applied voltage. Examples of a suitable gaseous environment include air at an elevated pressure, for example three times atmospheric pressure, carbon dioxide, nitrogen and oxygen, all at an elevated pressure such as three times atmospheric pressure. A suitable gaseous environment at atmospheric pressure is sulfur hexafluoride, although the discharge products of the former gases are more benign than that of sulfur hexafluoride.

Figure 6A:
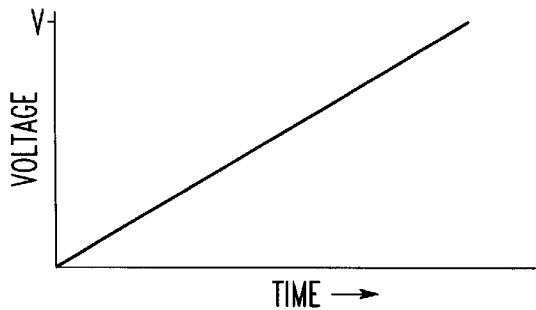
FIGS. 6 and 6B illustrates certain waveforms of the applied clearing voltage.
Figure 6B:
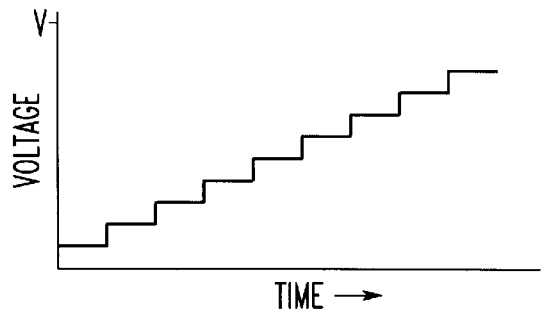

With capacitor 40 in the container 50 filled with a high strength gas a clearing operation can be initiated. FIG. 6A illustrates a ramping voltage which may be applied by voltage source 48 and FIG. 6B illustrates a step type voltage which may be applied. In either case the clearing voltage is increased to a value V which is higher, for example 20% higher, than the expected maximum operating potential of the capacitor during its intended use in an electric circuit. During such use, the capacitor is maintained in container 50 and within the gaseous environment 52, or may be transferred to another container filled with the same or a different high strength gaseous environment than that used for clearing.

By using a high strength gaseous environment for clearing, a smaller diameter clearing (see FIG. 3D) than conventionally obtained in air at atmospheric pressure extinguishes the discharge and much less electrode is removed. Further, because the discharge energy input is for a shorter period of time, and is over a smaller region, there is less stress on the ceramic.

Figure 7:
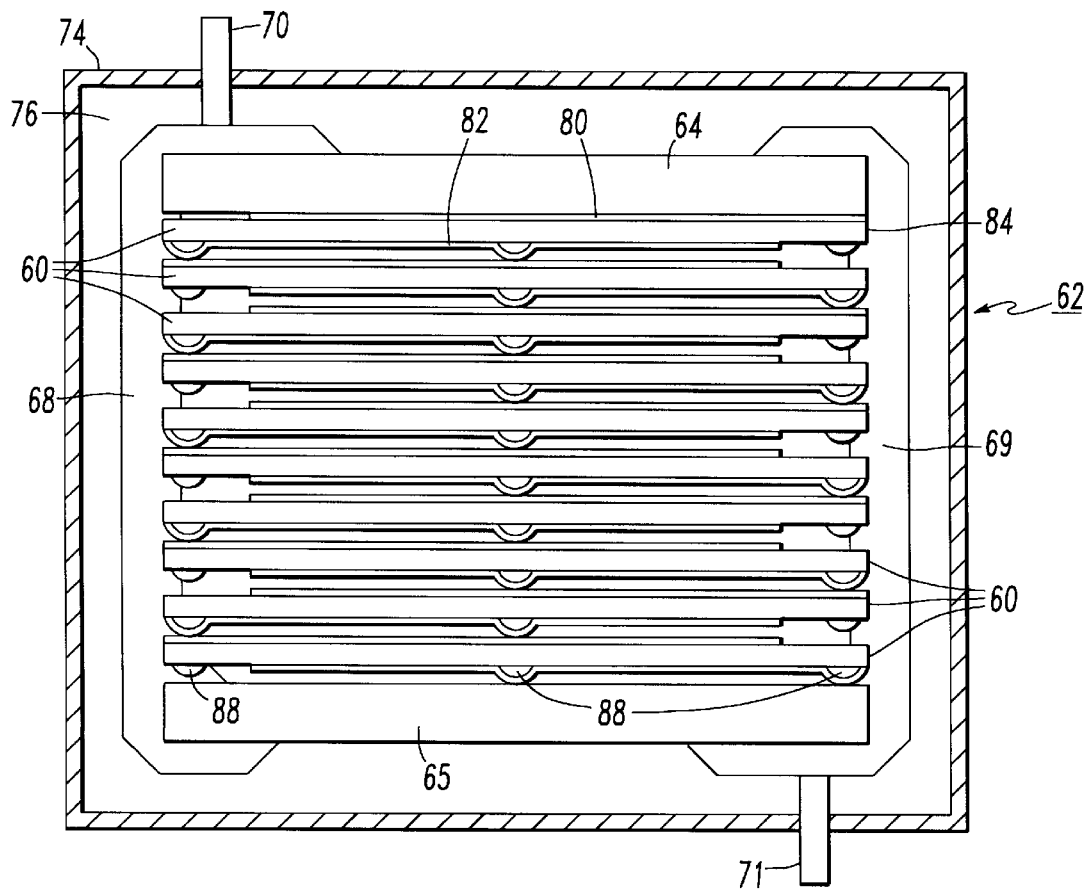
FIG. 7 illustrates a capacitor stack according to the present invention.

For most applications the capacitor will be used in a stack arrangement such as illustrated in FIG. 7. A plurality of individual ceramic dielectric capacitor modules 60 form a stack 62, sandwiched by end plates 64 and 65, which may be of a borosilicate. End sprays 68 and 69, to which are connected leads 70 and 71, are of an electrically conductive material such as aluminum or zinc, and contact the respective electrodes of the individual capacitor modules 60.

The stack arrangement 62 is enclosed in a container 74 having a high strength gaseous environment 76 and prior to use in an electric circuit, the stack 62 is cleared as previously described. In addition, in order to eliminate severely defective capacitors, prior to assembling in a stack, each capacitor module 60 is also cleared individually.

A typical capacitor module 60 is illustrated in more detail in FIGS. 8A through 8E. Capacitor module 60 includes a thin electrode 80 on the top surface (FIG. 8A) and a thin electrode 82 on the bottom surface (FIG. 8B) of a ceramic dielectric 84 (FIG. 8C). As seen in FIGS. 8A and 8B, an electrode-free area 86 is formed around three sides of the electrodes to prevent flashover. This electrode-free area 86 may be in the order of 3 mm for a square dielectric 84 of about 102 mm on a side and with a thickness of around 25 to 100 $\mu$m, with 200 Å thick deposited aluminum electrodes 80 and 82.

In order to minimize or eliminate clearing discharge induced cracking of adjacent dielectric members when in a stacked array, each capacitor module 60 includes an arrangement of spacers 88, which in one embodiment takes the form of a plurality of ridges 88 on the bottom surface of the dielectric 84. Three ridges are illustrated, one in the middle and one on either end of the dielectric, as best seen in FIG. 8B. The ridges 88 may be of the same ceramic as, and may be integral with, the dielectric and of a thickness of less than 25 $\mu$m. As seen in FIGS. 8D and 8E, which are enlarged views of the capacitor module ends, the bottom electrode 82 covers an end ridge 88 and will cover an opposite end ridge 88 on a next adjacent capacitor module in the stack, as illustrated in FIG. 7.

Although the present invention has been described with a certain degree of particularity, it is to be understood that various substitutions and modifications may be made without departing from the spirit and scope of the invention as defined in the appended claims. By way of example, the stabilization process has been described with respect to ceramic dielectrics. The process and system of clearing and operating in high electric strength gases is equally applicable to capacitors with polymer dielectrics. That is, conventional capacitor technology requires the use of a liquid impregnant for greater than 250 V operation, but at elevated temperatures the liquid would cause severe degradation of the polymer dielectric. The present invention would allow them to operate at temperatures up to about 300° C., and perhaps higher without a liquid impregnant.

What is claimed is:

1. A process for stabilizing a capacitor arrangement having at least one capacitor module having an expected maximum operating voltage and which includes a solid dielectric having electrodes on opposite surfaces thereof, prior to its use in an electric circuit according to the steps of:

(A) initially placing said capacitor module in an ambient gaseous environment having an electric strength greater than that of air at a pressure of one atmosphere;

(B) clearing said capacitor module by applying an increasing voltage to said electrodes to a value greater than the expected maximum operating voltage of said capacitor module when in said electric circuit; and (C) maintaining said cleared capacitor module in an ambient gaseous environment having an electric strength greater than that of air at a pressure of one atmosphere, for use during intended operation in said electric circuit.

2. A process for stabilizing a capacitor arrangement according to claim 1 wherein:

(A) said gaseous environment in which said capacitor module is to operate is the same as the gaseous environment in which said capacitor module is cleared.

3. A process for stabilizing a capacitor arrangement according to claim 1 wherein:

(A) said dielectric is a ceramic.

4. A process for stabilizing a capacitor arrangement according to claim 3 wherein:

(A) said dielectric is a borosilicate.

5. A process for stabilizing a capacitor arrangement according to claim 1 wherein:

(A) said dielectric is a polymer.

6. A process for stabilizing a capacitor arrangement according to claim 1 which includes the steps of:

(A) arranging a plurality of said capacitor module into a stack; and (B) making electrical contact with said electrodes of said capacitor module.

7. A process for stabilizing a capacitor arrangement according to claim 6 which includes the step of:

(A) clearing each said capacitor module prior to arranging them into said stack.

8. A process for stabilizing a capacitor arrangement according to claim 7 which includes the step of:

(A) clearing said stacked arrangement of said capacitor module.

9. A process for stabilizing a capacitor arrangement according to claim 6 which includes:

(A) spacer means between adjacent ones of said capacitor module in said stack.

10. A process for stabilizing a capacitor arrangement according to claim 9 wherein:

(A) said spacer means is constituted by ridges on at least one surface of said dielectric.

11. A capacitor arrangement according to claim 10 wherein:

(A) said ridges are an integral part of said dielectric.

12. A process for stabilizing a capacitor arrangement according to claim 1 wherein:

(A) said ambient gaseous environment in which said capacitor module is initially placed is selected from the group consisting of air at a pressure of at least three atmospheres, carbon dioxide at a pressure of at least three atmospheres, nitrogen at a pressure of at least three atmospheres, oxygen at a pressure of at least three atmospheres, and sulfur hexafluoride at a pressure of at least one atmosphere.

13. A process for stabilizing a capacitor arrangement according to claim 1 wherein:

(A) said ambient gaseous environment in which said cleared capacitor module is maintained is selected from the group consisting of air at a pressure of at least three atmospheres, carbon dioxide at a pressure of at least three atmospheres, nitrogen at a pressure of at least three atmospheres, oxygen at a pressure of at least three atmospheres, and sulfur hexafluoride at a pressure of at least one atmosphere.

* * * * *